US008850106B2

(12) United States Patent
Benhase et al.

(10) Patent No.: US 8,850,106 B2
(45) Date of Patent: *Sep. 30, 2014

(54) POPULATING STRIDES OF TRACKS TO DEMOTE FROM A FIRST CACHE TO A SECOND CACHE

(75) Inventors: Michael T. Benhase, Tucson, AZ (US); Lokesh M. Gupta, Tucson, AZ (US); Matthew J. Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,717

(22) Filed: May 7, 2012

(65) Prior Publication Data

US 2012/0303875 A1  Nov. 29, 2012

Related U.S. Application Data

(63) Continuation of application No. 13/113,931, filed on May 23, 2011.

(51) Int. Cl.
*G06F 12/00* (2006.01)
*G06F 11/10* (2006.01)
*G06F 12/08* (2006.01)
*G06F 11/16* (2006.01)

(52) U.S. Cl.
CPC ........ *G06F 12/0804* (2013.01); *G06F 12/0866* (2013.01); *G06F 12/0897* (2013.01); *G06F 11/1076* (2013.01); *G06F 11/1666* (2013.01); *G06F 2212/262* (2013.01)
USPC .......................... 711/103; 711/113

(58) Field of Classification Search
CPC ............ G06F 12/0866; G06F 12/0868; G06F 12/0804; G06F 12/0862; G06F 12/0897; G06F 12/123; G06F 12/08; G06F 12/0808; G06F 12/0246; G06F 12/811; G06F 11/1076; G06F 2212/262; G06F 2212/283
USPC ........................................ 711/103
See application file for complete search history.

(56) References Cited

U.S. PATENT DOCUMENTS 4,464,713 A   8/1984   Benhase et al.
5,860,090 A   1/1999   Clark
(Continued)

FOREIGN PATENT DOCUMENTS

CN   1967495      5/2007
CN   1967507      5/2007
WO   2011042428   4/2011

OTHER PUBLICATIONS

"Check Point Copy for a Two Stage Store", IBM Corp., IP.com Document No. IPCOM000089366D, pp. 1955-1958, Oct. 1, 1977, pp. 1-5.

(Continued)

*Primary Examiner* — Reginald Bragdon
*Assistant Examiner* — Hannah A Faye-Joyner
(74) *Attorney, Agent, or Firm* — David W. Victor; Konrad Raynes Davda & Victor LLP

(57) ABSTRACT

Provided are a computer program product, system, and method for populating strides of tracks to demote from a first cache to a second cache. A first cache maintains modified and unmodified tracks from a storage system subject to Input/Output (I/O) requests. A determination is made to demote tracks from the first cache. A determination is made as to whether there are enough tracks ready to demote to form a stride, wherein tracks are written to a second cache in strides defined for a Redundant Array of Independent Disk (RAID) configuration. A stride is populated with tracks ready to demote in response to determining that there are enough tracks ready to demote to form the stride. The stride of tracks, to demote from the first cache, are promoted to the second cache. The tracks in the second cache that are modified are destaged to the storage system.

12 Claims, 13 Drawing Sheets

(56) References Cited

U.S. PATENT DOCUMENTS

| | | | |
|---|---|---|---|
| 5,860,091 A | 1/1999 | DeKoning et al. | |
| 6,785,771 B2* | 8/2004 | Ash et al. | 711/136 |
| 7,107,385 B2 | 9/2006 | Rajan et al. | |
| 7,444,478 B2 | 10/2008 | LaFrese et al. | |
| 7,562,203 B2 | 7/2009 | Scott et al. | |
| 7,650,341 B1 | 1/2010 | Oratovsky et al. | |
| 7,669,022 B2 | 2/2010 | Maruyama et al. | |
| 7,698,501 B1 | 4/2010 | Corbett et al. | |
| 7,702,870 B2 | 4/2010 | English et al. | |
| 7,721,043 B2 | 5/2010 | Gill et al. | |
| 7,725,651 B2 | 5/2010 | Saito | |
| 7,769,960 B2 | 8/2010 | LaFrese et al. | |
| 7,930,325 B2 | 4/2011 | Siegwart et al. | |
| 2001/0029574 A1 | 10/2001 | Razdan et al. | |
| 2002/0166022 A1 | 11/2002 | Suzuki | |
| 2002/0199070 A1 | 12/2002 | Chaudhry et al. | |
| 2003/0028695 A1 | 2/2003 | Burns et al. | |
| 2003/0070042 A1 | 4/2003 | Byrd et al. | |
| 2003/0105928 A1 | 6/2003 | Ash et al. | |
| 2004/0068612 A1 | 4/2004 | Stolowitz | |
| 2004/0098541 A1 | 5/2004 | Megiddo et al. | |
| 2005/0073884 A1 | 4/2005 | Gonzalez et al. | |
| 2005/0144360 A1 | 6/2005 | Bennett et al. | |
| 2005/0257083 A1 | 11/2005 | Cousins | |
| 2006/0106891 A1 | 5/2006 | Mahar et al. | |
| 2006/0155934 A1 | 7/2006 | Rajamony et al. | |
| 2007/0106707 A1 | 5/2007 | Yamato | |
| 2007/0118695 A1 | 5/2007 | Lowe et al. | |
| 2009/0210620 A1 | 8/2009 | Jibbe et al. | |
| 2009/0216954 A1 | 8/2009 | Benhase et al. | |
| 2009/0271412 A1 | 10/2009 | Lacapra et al. | |
| 2009/0271418 A1 | 10/2009 | Vaghani et al. | |
| 2010/0082774 A1 | 4/2010 | Pitts | |
| 2010/0166022 A1 | 7/2010 | Cho | |
| 2010/0191907 A1 | 7/2010 | Ish | |
| 2010/0293420 A1 | 11/2010 | Kapil et al. | |
| 2011/0087837 A1 | 4/2011 | Blinick et al. | |
| 2011/0191523 A1* | 8/2011 | Caulkins | 711/103 |
| 2011/0202732 A1 | 8/2011 | Montgomery | |
| 2013/0111106 A1 | 5/2013 | Benhase et al. | |
| 2013/0111134 A1 | 5/2013 | Benhase et al. | |

OTHER PUBLICATIONS

"Serial ATA Native Command Queuing" joint WhitePaper by Intel Corporation and Seagate Technology, Jul. 2003, pp. 1-12.
"Multiple Command Control and Reordering", [online] [retrieved May 14, 2011], pp. 1-2 http://www.pcguide.com/ref/hdd/op/logicMultiple-c.html.
"Superparamagnetic Effect on Hard Disk Drive", [online] [retrieved May 16, 2011], pp. 1-2, http://www.dataclinic.co.uk/hard-disk-superparamagnetic-effect.html.
"Superparamagnetism", Wikipedia, [online] [retrieved May 19, 2011], pp. 1-5, http://en.wikipedia.org/w/index/php?title=Superparamagnetism&printable . . . .
"Seagate's Terabyte Platters Make it the Densest of the Lot", The Register, [online] [retrieved May 19, 2011], pp. 1-2, http://www.theregister.co.uk/2011/05/03seagate_terabyte_platter/ . . . .
Hitachi Demos 230 Gb Per Square Inch Data Density on Perpendicular Re . . . , [online] [retrieved May 19, 2011], pp. 1-9, http://www.physorg.com/news3588.html.
"Hard Disk Drive", Wikipedia, [online] [retrieved May 19, 2011], pp. 1-23, http://en.wikipedia.org/w/index.php? title=hard_disk_drive &printable=yes.
U.S. Appl. No. 13/113,974, filed May 23, 2011, by inventors M.Benhase, et al.
U.S. Appl. No. 13/113,937, filed May 23, 2011, by inventors K. Ash, et al.
U.S. Appl. No. 13/113,944, filed May 23, 2011, by inventors M.Benhase, et al.
U.S. Appl. No. 13/113,949, filed May 23, 2011, by inventors M.Benhase, et al.
U.S. Appl. No. 13/113,953, filed May 23, 2011, by inventors M.Benhase, et al.
U.S. Appl. No. 13/113,958, filed May 23, 2011, by inventors M.Benhase, et al.
U.S. Appl. No. 13/113,931, filed May 23, 2011, entitled "Populating Strides of Tracks to Demote from a Frist Cache to a Second Cache", invented by Benhase, M.T., Total 42 pp. [18.409 (Appln)].
Preliminary Amendment 1, Jul. 12, 2011, for U.S. Appl. No. 13/113,931, filed May 23, 2011 by M.T. Benhase et al., Total 16 pp. [18.409 (PrelimAmend1)].
Preliminary Amendment 2, May 7, 2012, for U.S. Appl. No. 13/113,931, filed May 23, 2011 by M.T. Benhase et al., Total 8 pp. [18.409 (PrelimAmend2)].
U.S. Appl. No. 13/352,230, filed Jan. 17, 2012, by inventors K. Ash, et al.
Preliminary Amendment filed May 4, 2012, 8 pp, for U.S. Appl. No. 13/352,230, by inventors K. Ash, et al.
U.S. Appl. No. 13/464,668, filed May 4, 2012, by inventors K. Ash, et al.
Preliminary Amendment filed May 4, 2012, 6 pp., for U.S. Appl. No. 13/464,668, by inventors K. Ash, et al.
U.S. Appl. No. 13/352,224, filed Jan. 17, 2012, by inventors M. et al.
Preliminary Amendment filed Feb. 27, 2013, pp. 9, for U.S. Appl. No. 13/352,224, filed Jan. 17, 2012, by inventors M. et al.
U.S. Appl. No. 13/779,309, filed Feb. 27, 2013, by inventors M. et al.
Preliminary Remarks filed Feb. 27, 2013, pp. 2, for U.S. Appl. No. 13/779,309, filed Feb. 27, 2013, by inventors M. et al.
U.S. Appl. No. 13/352,236, filed Jan. 17, 2012, by inventors M. Benhase et al.
Preliminary Amendment filed Feb. 27, 2013, pp. 8, for U.S. Appl. No. 13/352,236, filed Jan. 17, 2012, by inventors M. Benhase et al.
U.S. Appl. No. 13/779,412, filed Feb. 27, 2013, by inventors M. Benhase et al.
Preliminary Remarks filed Feb. 27, 2013, pp. 2, for U.S. Appl. No. 13/779,412, filed Feb. 27, 2013, by inventors M. Benhase et al.
U.S. Appl. No. 13/352,239, filed Jan. 17, 2012, by inventors K. Ash, et al.
Preliminary Amendment filed Feb. 27, 2013, pp. 8, for U.S. Appl. No. 13/352,239, filed Jan. 17, 2012, by inventors K. Ash, et al.
U.S. Appl. No. 13/779,439, filed Feb. 27, 2013, by inventors K. Ash, et al.
Preliminary Remarks filed Feb. 27, 2013, pp. 2, for U.S. Appl. No. 13/779,439, filed Feb. 27, 2013, by inventors K. Ash, et al.
English Translation of CN1967495 filed May 23, 2007 by IBM Corp.
Office Action dated Oct. 10, 2013, pp. 45, for U.S. Appl. No. 13/779,412, filed Feb. 27, 2013.
Response dated Oct. 8, 2013, pp. 12, to Office Action dated Jul. 8, 2013, pp. 31, for U.S. Appl. No. 13/113,931, filed May 23, 2011.
Office Action dated Sep. 5, 2013, pp. 33, for U.S. Appl. No. 13/779,309, filed 013-02-27.
Office Action dated Oct. 3, 2013, pp. 37, for U.S. Appl. No. 13/352,236, filed Jan. 17, 2012.
PCT Search Report & Written Opinion dated May 2, 2013 for PCT/IB2012/057140 filed Dec. 10, 2012.
Office Action dated Jul. 8, 2013, pp. 31, for U.S. Appl. No. 13/113,931, filed May 23, 2011 by M.T. Benhase et al.
Office Action dated Aug. 30, 2013, pp. 55, for U.S. Appl. No. 13/352,224, filed Jan. 17, 2012, by inventors M. et al.
English Translation of CN1967507 filed May 23, 2007 by IBM Corp.
UK Combined Search Report & Examination Report dated Jul. 19, 2013 for GB1300444.5 filed Jan. 10, 2013.
Office Action dated Nov. 8, 2013, pp. 65 for U.S. Appl. No. 13/352,230.
Office Action dated Nov. 8, 2013, pp. 65 for U.S. Appl. No. 13/464,668.
Office Action dated Oct. 18, 2013, pp. 54, for U.S. Appl. No. 13/352,239, filed Jan. 17, 2012.
Office Action dated Oct. 25, 2013, pp. 49, for U.S. Appl. No. 13/779,439, filed Feb. 27, 2013.
UK Response dated Dec. 9, 2013 to Official Letter received Jul. 19, 2013 for GB1300444.5 filed Jan. 10, 2013.

(56) References Cited

OTHER PUBLICATIONS

Response dated Dec. 2, 2013, p. 13 to Office Action dated Aug. 30, 2013, pp. 55, for U.S. Appl. No. 13/352,224, filed Jan. 17, 2012, by inventors M. et al.
Response dated Dec. 5, 2013, pp. 9, to Office Action dated Sep. 5, 2013, pp. 33, for U.S. Appl. No. 13/779,309, filed Feb. 27, 2013.
Response dated Jan. 3, 2014, pp. 1, to Office Action dated Oct. 3, 2013, pp. 37, for U.S. Appl. No. 13/352,236, filed Jan. 17, 2012.
Response dated Jan. 10, 2014, pp. 9, for U.S. Appl. No. 13/779,412, filed Feb. 27, 2013.
Office Action dated Jan. 10, 2014, pp. 67, for U.S. Appl. No. 13/352,236, filed Jan. 17, 2012.
Office Action dated Dec. 24, 2013, pp. 38, for U.S. Appl. No. 13/113,931, filed on May 23, 2011 by M.T. Benhase et al.
Response dated Jan. 21, 2014, pp. 10, to Office Action dated Oct. 25, 2013, pp. 49, for U.S. Appl. No. 13/779,439, filed Feb. 27, 2013.
Response dated Jan. 21, 2014, pp. 13, to Office Action dated Oct. 18, 2013, pp. 54, for U.S. Appl. No. 13/352,239, filed Jan. 17, 2012.
Response dated Feb. 7, 2014, pp. 13, to Office Action dated Nov. 8, 2013, pp. 65 for U.S. Appl. No. 13/352,230.
Response dated Feb. 7, 2014, pp. 9, to Office Action dated Nov. 8, 2013, pp. 65 for U.S. Appl. No. 13/464,668.
Final Office Action dated Apr. 7, 2014, pp. 41, for U.S. Appl. No. 13/352,239, filed Jan. 17, 2012.
Final Office Action dated Oct. 25, 2014, pp. 38, for U.S. Appl. No. 13/779,439, filed Feb. 27, 2013.
Response dated Apr. 8, 2014, pp. 10, to Office Action dated Jan. 10, 2014, pp. 67, for U.S. Appl. No. 13/352,236, filed Jan. 17, 2012.
Response dated Mar. 24, 2014, pp. 10, to Office Action dated Dec. 24, 2013, pp. 38, for U.S. Appl. No. 13/113,931, filed on May 23, 2011.
Final Office Action dated Mar. 24, 2014, pp. 36 for U.S. Appl. No. 13/464,668.
Final Office Action dated Mar. 24, 2014, pp. 37, for U.S. Appl. No. 13/352,230.
Notice of Allowance dated Apr. 29, 2014, pp. 55, for U.S. Appl. No. 13/352,224, filed Jan. 17, 2012, by inventors M. et al.
Notice of Allowance dated Apr. 30, 2014, pp. 50, for U.S. Appl. No. 13/779,309, filed Feb. 27, 2013.
Notice of Allowance dated Apr. 30, 2014, pp. 29, for U.S. Appl. No. 13/352,236, filed Jan. 17, 2012.
Notice of Allowance dated Apr. 22, 2014, pp. 45, U.S. Appl. No. 13/779,412, filed Feb. 27, 2013.
Notice of Allowance dated Apr. 17, 2014, pp. 18, for U.S. Appl. No. 13/113,931, filed on May 23, 2011.

* cited by examiner

Second Cache RAID Configuration

Storage System RAID Configuration

POPULATING STRIDES OF TRACKS TO DEMOTE FROM A FIRST CACHE TO A SECOND CACHE

CROSS-REFERENCE TO RELATED APPLICATION

This application is a continuation of U.S. patent application Ser. No. 13/113,931, filed May 23, 2011, which application is incorporated herein by reference in its entirety.

BACKGROUND OF THE INVENTION

1. Field of the Invention

The present invention relates to a computer program product, system, and method for populating strides of tracks to demote from a first cache to a second cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

The LRU cache technique seeks to optimize for temporal locality so as to destage tracks that are least likely to be rewritten soon in order to minimize the number of destage operations, i.e., if a write that is not destaged is overwritten than the destaging of the overwritten write is avoided, thus saving the time and effort of writing the data from cache to disk. On the other hand there is also a desire to destage in a manner that exploits spatial locality, which means that data is written to storage locations that are closest to each other to minimize the distance the storage device write mechanism and storage media needs to be moved to reach the next storage location to write.

One technique for exploiting both temporal and spatial locality is the Wise Ordering for Writes (WOW) algorithm. The WOW algorithm employs a circular linked list or clock where the circular linked list has one entry for each write request buffered in cache. The entries are ordered in the linked list according to the storage location to which the associated write request is directed to exploit the benefits of spatial locality. Further, each entry includes a bit indicating whether the write data for the storage location in the cache has been recently updated. The bit for an entry is set when the write data for the entry is updated. A pointer points to a current entry in the circular linked list. A task using the WOW algorithm accesses an entry addressed by the pointer. If the bit for the entry indicates that the data for the entry in cache has been recently updated, then the bit is set to indicate that the write data has not been recently updated and the pointer incremented to point to the next entry so that the entry having write data to a storage location next closest in spatial proximity to the previously written storage location is considered. The entry is selected to write that is closest in spatial proximity to the last written storage location and whose bit indicates that the write data for the entry has not recently been updated.

Thus, with the WOW algorithm, spatial locality is exploited because a next entry to write is selected for consideration that is closest in spatial proximity to the last destaged write request. Further, temporal locality is exploited because an entry that has recently been written will be skipped until the pointer circles back to that skipped entry to consider.

Disk drives may implement the WOW algorithm and other algorithms that take both the linear and the angular position of the write tracks into account and optimize for both with respect to a current write head position to determine the minimal total service time. This process is referred to as "command re-ordering based on seek and rotational optimization". The disk drive logic boards will analyze write requests and determine which to do first based on both how much time will be required to seek to the various cylinders and angular position of the track to write, and how much time will elapse waiting for the data to rotate under the heads.

There is a need in the art for improved techniques for using cache in a storage system.

SUMMARY

Provided are a computer program product, system, and method for populating strides of tracks to demote from a first cache to a second cache. A first cache maintains modified and unmodified tracks from a storage system subject to Input/Output (I/O) requests. A determination is made to demote tracks from the first cache. A determination is made as to whether there are enough tracks ready to demote to form a stride, wherein tracks are written to a second cache in strides defined for a Redundant Array of Independent Disk (RAID) configuration. A stride is populated with tracks ready to demote in response to determining that there are enough tracks ready to demote to form the stride. The stride of tracks, to demote from the first cache, are promoted to the second cache. The tracks in the second cache that are modified are destaged to the storage system.

DETAILED DESCRIPTION

Figure 1:
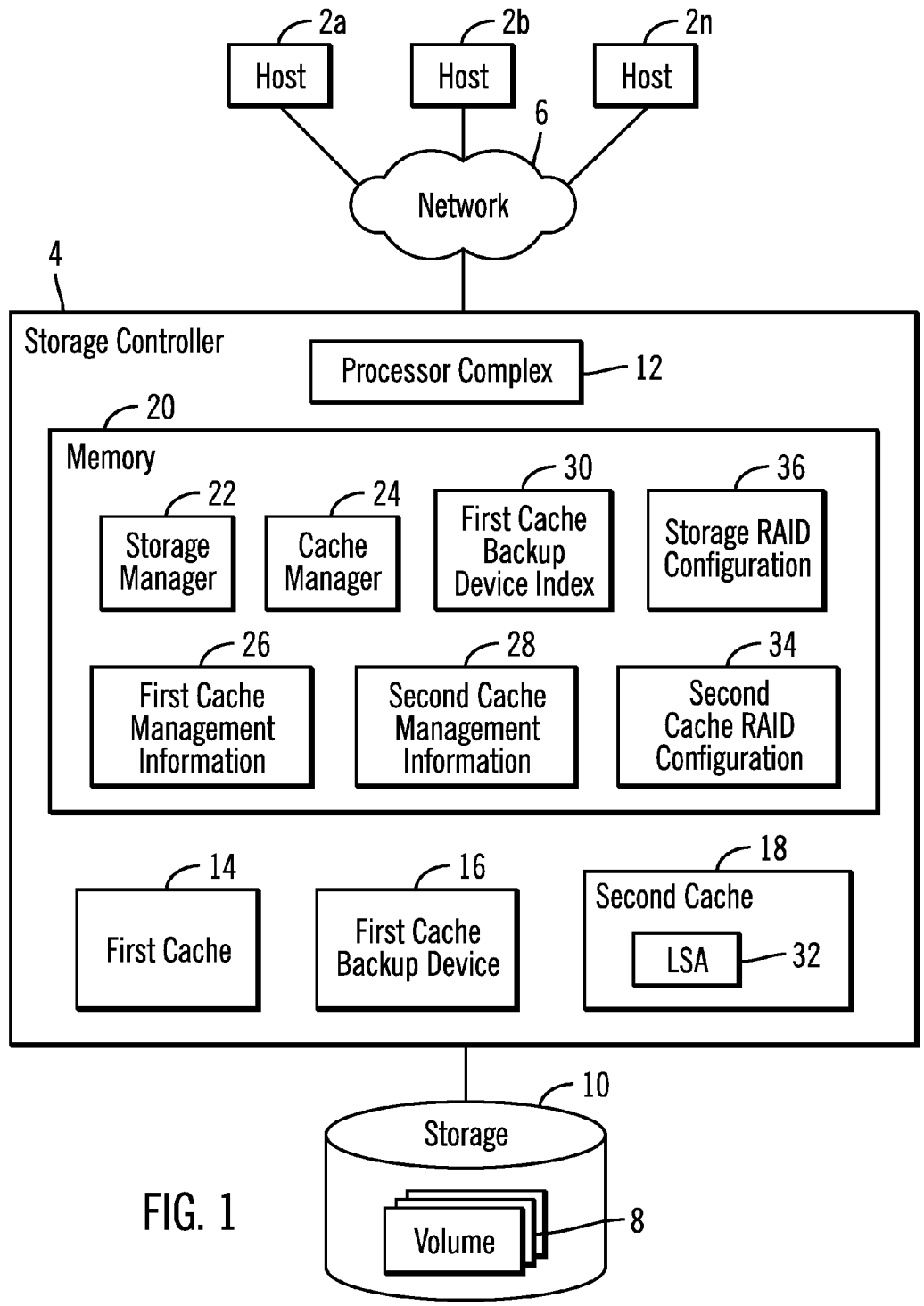
FIG. 1 illustrates an embodiment of a computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 4 includes a processor complex 12, including one or more processors with single or multiple cores, a first cache 14, a first cache backup device 16, to backup tracks in the cache 14, and a second cache 18. The first 14 and second 18 caches cache data transferred between the hosts 2a, 2b . . . 2n and the storage 10. The first cache backup device 16 may provide non-volatile storage of tracks in the first cache 14. In a further embodiment, the first cache backup device 16 may be located in a cluster or hardware on a different power boundary than that of the first cache 14.

The storage controller 4 has a memory 20 that includes a storage manager 22 for managing the transfer of tracks transferred between the hosts 2a, 2b . . . 2n and the storage 10 and a cache manager 24 that manages data transferred between the hosts 2a, 2b . . . 2n and the storage 10 in the first cache 14, first cache backup device 16, and the second cache 18. A track may comprise any unit of data configured in the storage 10, such as a track, Logical Block Address (LBA), etc., which is part of a larger grouping of tracks, such as a volume, logical device, etc. The cache manager 24 maintains first cache management information 26 and second cache management information 28 to manage read (unmodified) and write (modified) tracks in the first cache 14 and the second cache 18. A first cache backup device index 30 provides an index of track identifiers to a location in the first cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

The second cache 18 may store tracks in a log structured array (LSA) 32, where tracks are written in a sequential order as received, thus providing a temporal ordering of the tracks written to the second cache 18. In a LSA, later versions of tracks already present in the LSA are written at the end of the LSA 32. In alternative embodiments, the second cache 18 may store data in formats other than in an LSA.

The memory 20 further includes second cache RAID configuration information 34 providing information on a RAID configuration used to determine how to add tracks in the first cache 14 to a stride to destage to the second cache 18. In one embodiment, the second cache 18 may be comprised of a plurality of storage devices, such as separate flash memories, such that the strides formed of tracks in the first cache are striped across the separate storage devices, such as flash memories. In a further embodiment, the second cache 18 may comprise a single storage device, such as one flash memory, such that the tracks are grouped in strides as defined by the second cache RAID configuration 34, but the tracks are written as strides to a single device, such as one flash memory, implementing the second cache 18. The tracks of strides configured for the second cache RAID configuration 34 may be written to the LSA 32 in the second cache 18 device.

The memory 20 further includes storage RAID configuration information 36 providing information on a RAID configuration used to determine how to add tracks in the second cache 18 to strides to destage to the storage system 10, where the tracks in the destaged stride are striped across the storage drives in the storage system 10.

In one embodiment, the first cache 14 may comprise a Random Access Memory (RAM), such as a Dynamic Random Access Memory (DRAM), and the second cache 18 may comprise a flash memory, such as a solid state device, and the storage 10 is comprised of one or more sequential access storage devices, such as hard disk drives and magnetic tape. The storage 10 may comprise a single sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the first cache 14 is a faster access device than the second cache 18, and the second cache 18 is a faster access device than the storage 10. Further, the first cache 14 may have a greater cost per unit of storage than the second cache 18 and the second cache 18 may have a greater cost per unit of storage than storage devices in the storage 10.

The first cache 14 may be part of the memory 20 or implemented in a separate memory device, such as a DRAM. In one embodiment, the first cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 2:
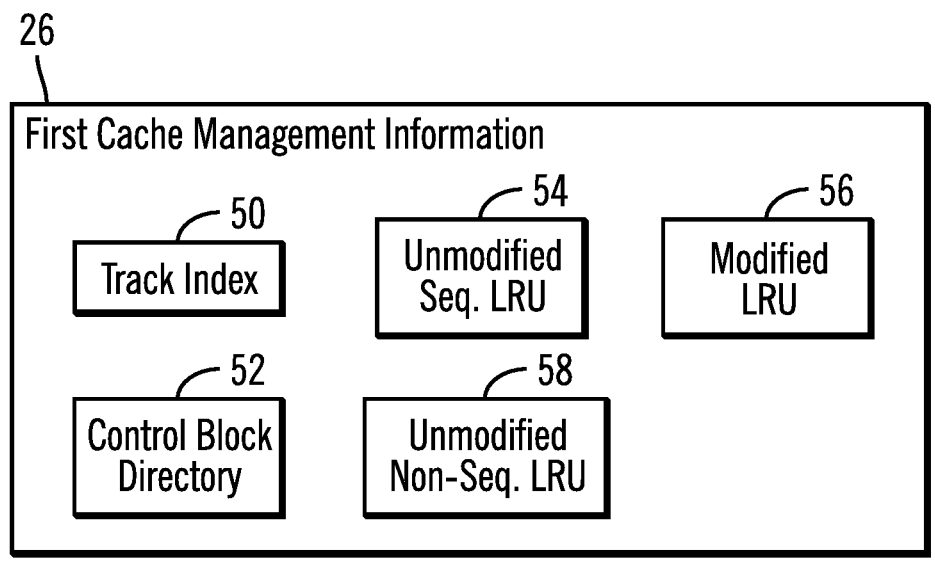
FIG. 2 illustrates an embodiment of first cache management information.

FIG. 2 illustrates an embodiment of the first cache management information 26 including a track index 50 providing an index of tracks in the first cache 14 to control blocks in a control block directory 52; an unmodified sequential LRU list 54 providing a temporal ordering of unmodified sequential tracks in the first cache 14; a modified LRU list 56 providing a temporal ordering of modified sequential and non-sequential tracks in the first cache 14; and an unmodified non-sequential LRU list 58 providing a temporal ordering of unmodified non-sequential tracks in the first cache 14.

In certain embodiments, upon determining that the first cache backup device 16 is full, the modified LRU list 56 is used to destage modified tracks from the first cache 14 so that the copy of those tracks in the first cache backup device 16 may be discarded to make room in the first cache backup device 16 for new modified tracks.

Figure 3:
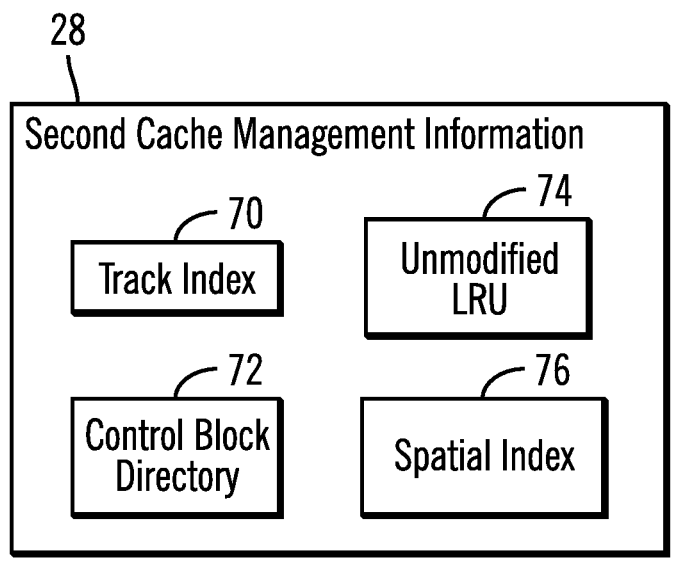
FIG. 3 illustrates an embodiment of second cache management information.

FIG. 3 illustrates an embodiment of the second cache management information 28 including a track index 70 providing an index of tracks in the second cache 18 to control blocks in a control block directory 72; an unmodified list 74 providing a temporal ordering of unmodified tracks in the second cache 18; and a spatial index 76 providing a spatial ordering of the modified tracks in the second cache 18 based on the physical locations in the storage 10 at which the modified tracks are stored.

All the LRU lists 54, 56, 58, and 74 may include the track IDs of tracks in the first cache 14 and the second cache 18 ordered according to when the identified track was last accessed. The LRU lists 54, 56, 58, and 74 have a most recently used (MRU) end indicating a most recently accessed track and a LRU end indicating a least recently used or accessed track. The track IDs of tracks added to the caches 14 and 18 are added to the MRU end of the LRU list and tracks demoted from the caches 14 and 18 are accessed from the LRU end. The track indexes 50 and 70 and spatial index 76 may comprise a scatter index table (SIT). Alternative type data structures may be used to provide the temporal ordering of tracks in the caches 14 and 18 and spatial ordering of tracks in the second cache 18.

Non-sequential tracks may comprise Online Line Transaction Processing (OLTP) tracks, which often comprise small block writes that are not fully random and have some locality of reference, i.e., have a probability of being repeatedly accessed.

Figure 4:
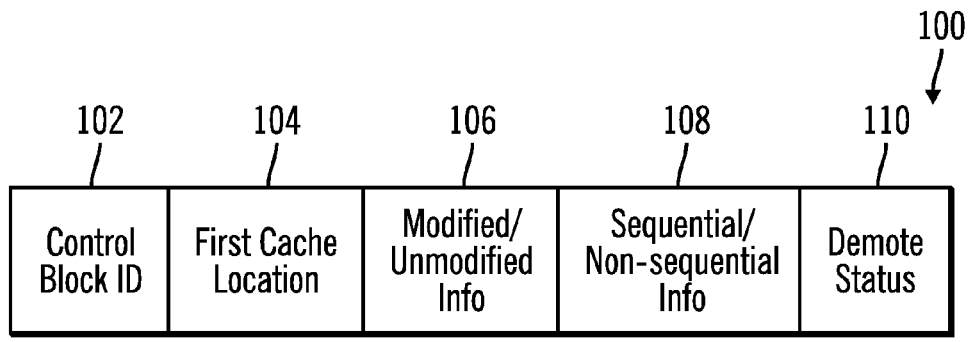
FIG. 4 illustrates an embodiment of a first cache control block.

FIG. 4 illustrates an embodiment of a first cache control block 100 entry in the control block directory 52, including a control block identifier (ID) 102, a first cache location 104 of the physical location of the track in the first cache 14, information 106 indicating whether the track is modified or unmodified, information 108 indicating whether the track is a sequential or non-sequential access, and information 110 indicating a demote status for the track, such as no demotion, ready to demote, and demote complete.

Figure 5:
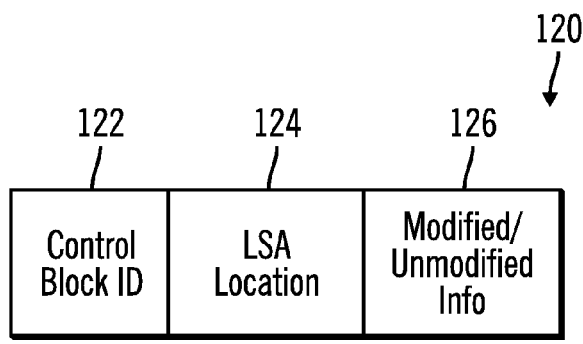
FIG. 5 illustrates an embodiment of a second cache control block.

FIG. 5 illustrates an embodiment of a second cache control block 120 entry in the second cache control block directory 72, including a control block identifier (ID) 122, an LSA location 124 where the track is located in the LSA 32, and information 126 indicating whether the track is modified or unmodified.

Figure 6:
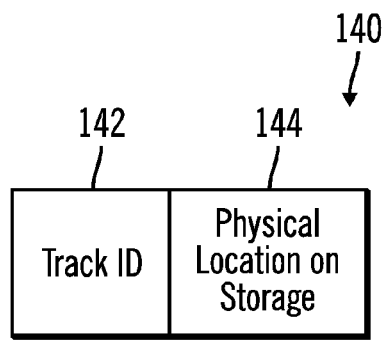
FIG. 6 illustrates an embodiment of a spatial index entry.

FIG. 6 illustrates a spatial index entry 140 including a track identifier 142 of a track in the second cache 18 and the physical location 144 of where the track is stored in the storage 10, such as a cylinder, platter, block address, and storage device identifier.

Figure 7:
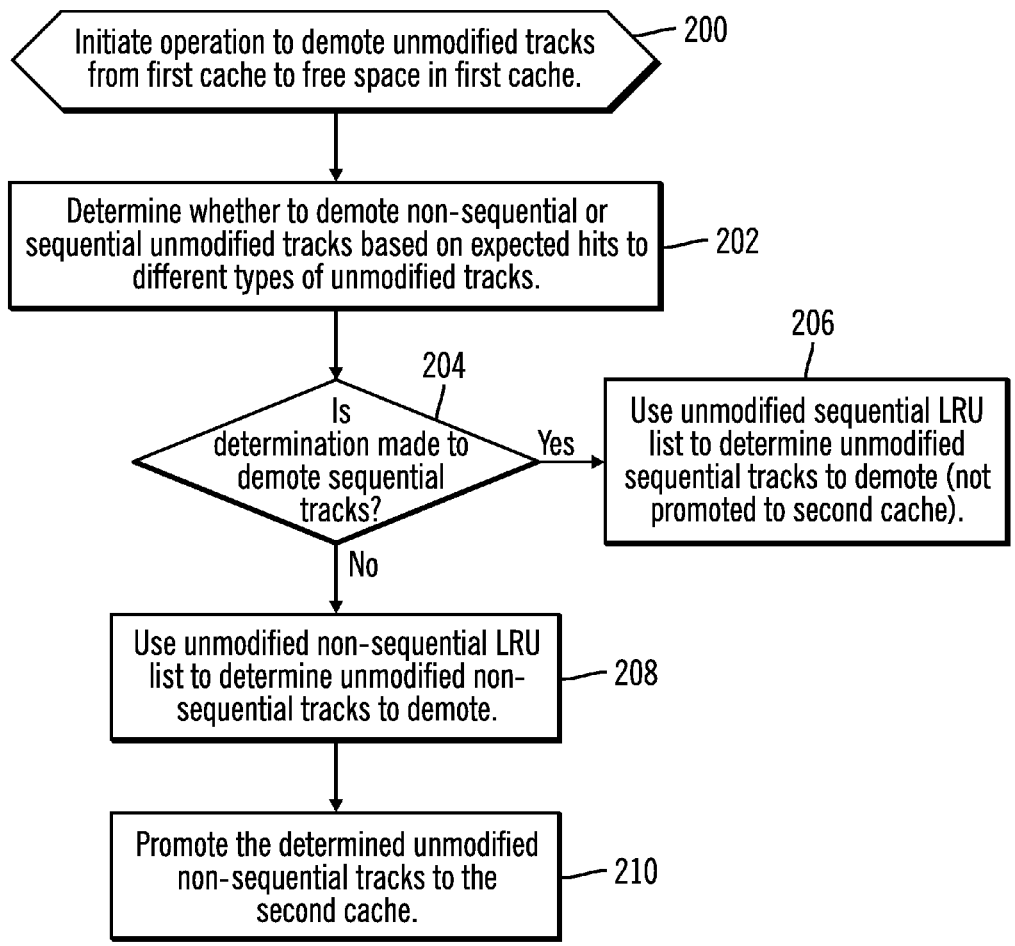
FIG. 7 illustrates an embodiment of operations to demote unmodified tracks from the first cache.

FIG. 7 illustrates an embodiment of operations performed by the cache manager 24 to demote unmodified tracks from the first cache 14. The demote operation may be initiated upon determining to free space in the first cache 14. Upon initiating (at block 200) an operation to determine whether to remove tracks from the first cache 14 to free space in the first cache 14, the cache manager 24 determines (at block 202) whether to demote non-sequential or sequential unmodified tracks based on expected hits to different types of unmodified tracks. If (at block 204) the determination is to demote unmodified sequential tracks, then the cache manager 24 uses (at block 206) the unmodified sequential LRU list 54 to determine unmodified sequential tracks to demote, from the LRU end of the list, which are not promoted to the second cache 18. If (at block 204) the determination is made to demote unmodified non-sequential tracks, then the cache manager uses the unmodified non-sequential LRU list 58 to determine (at block 208) unmodified non-sequential tracks to demote. The unmodified non-sequential tracks are promoted (at block 210) to the second cache 18.

Figure 8:
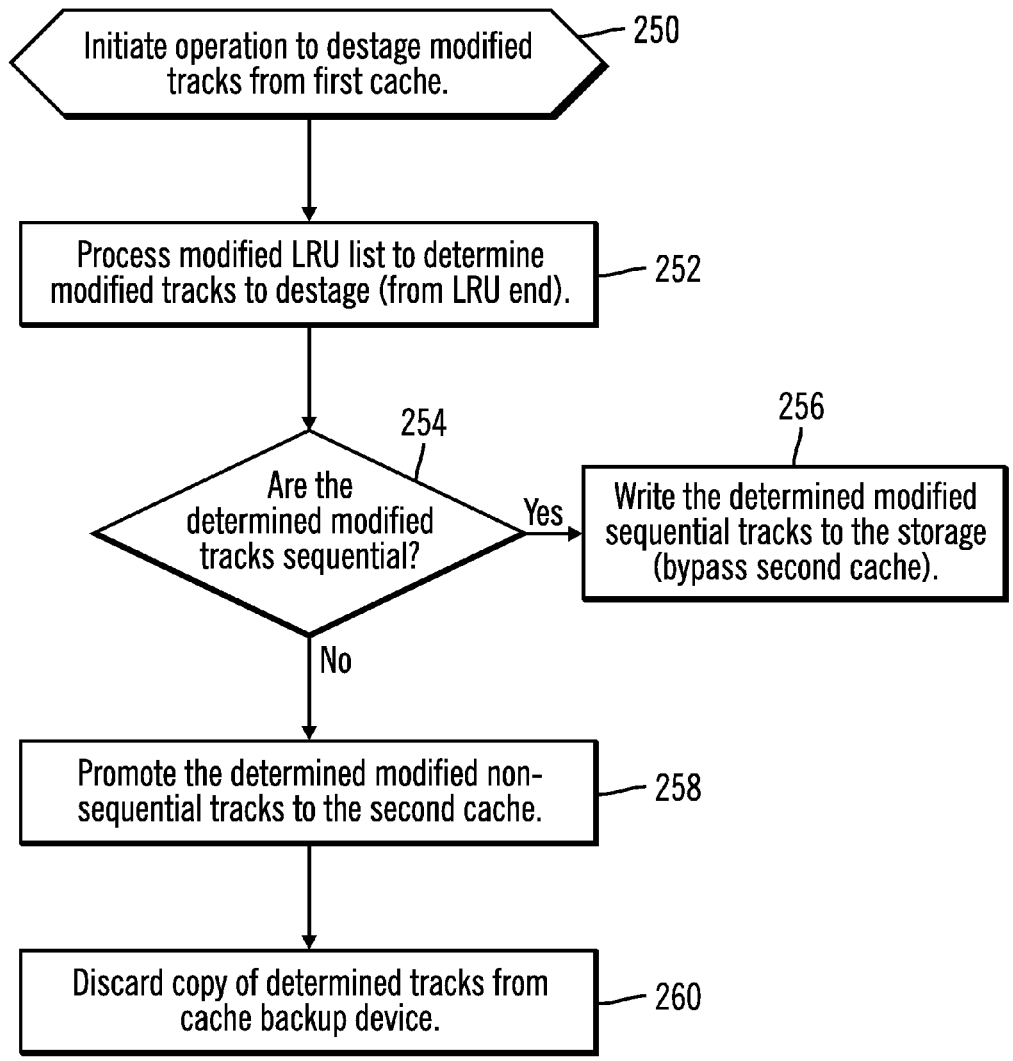
FIG. 8 illustrates an embodiment of operations to destage modified tracks from the first cache.

FIG. 8 illustrates an embodiment of operations performed by the cache manager 24 to destage modified tracks from the first cache 14. The cache manager 24 may regularly destage tracks as part of scheduled operations and increase the rate of destages if space is needed in the first cache backup device 16. Upon initiating (at block 250) the operation to destage modified tracks, the cache manager 24 processes (at bock 252) the modified LRU list 56 to determine modified tracks to destage, from the LRU end of the LRU list 56. If (at block 254) the determined modified tracks are sequential, then the cache manager 24 writes (at block 256) the determined modified sequential tracks to the storage 10, bypassing the second cache 18. If (at block 254) the modified tracks are non-sequential, then the cache manager 24 promotes (at block 258) the determined modified non-sequential tracks to the second cache 18 and discards (at block 260) the copy of the determined modified tracks from the first cache backup device 16.

With the operations of FIGS. 7 and 8, non-sequential tracks are demoted but not promoted to the second cache 18. Sequential modified (writes) are written directly to the storage 10, bypassing the second cache. Sequential unmodified tracks (reads) are discarded and not copied elsewhere, and unmodified non-sequential tracks demoted from the first cache 14 are promoted to the second cache 18.

Figure 9:
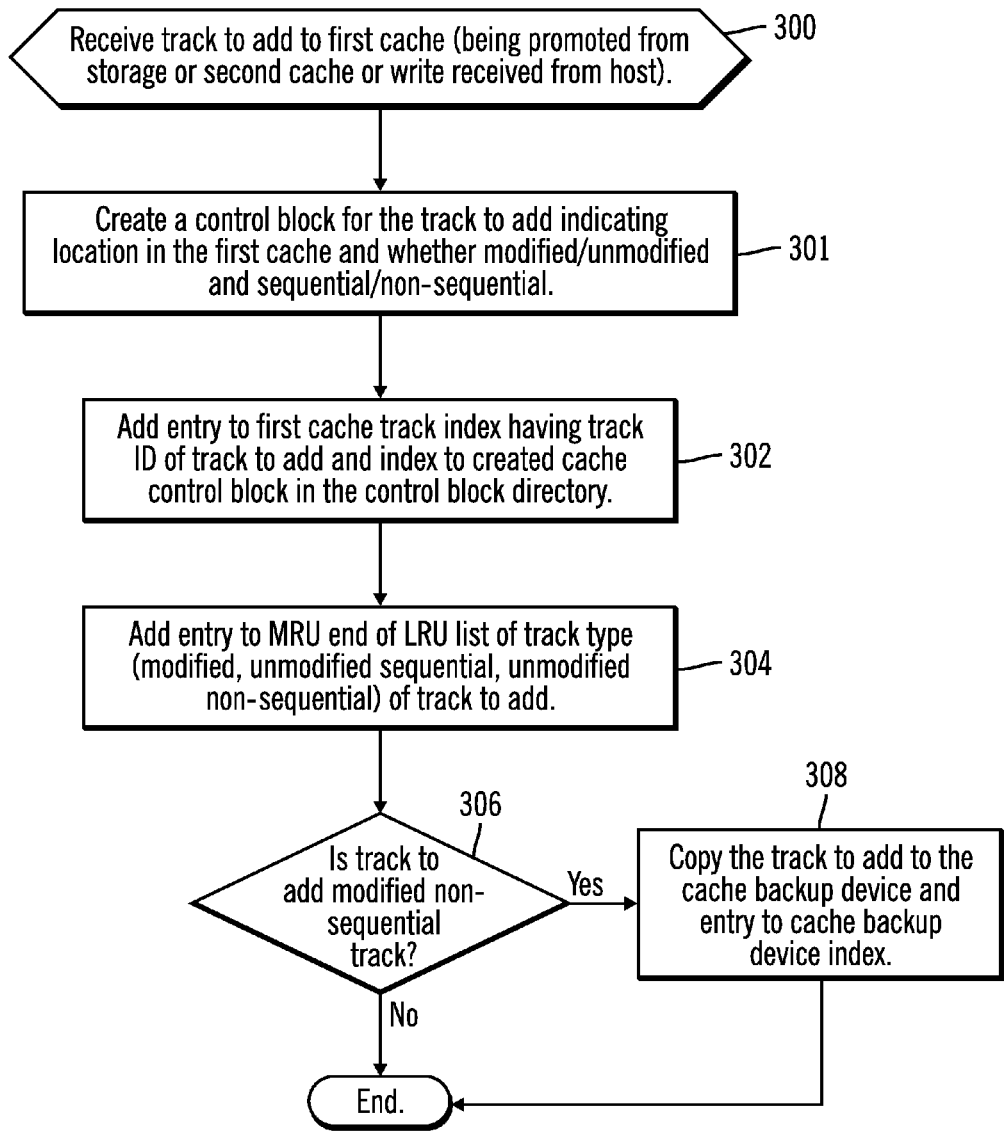
FIG. 9 illustrates an embodiment of operations to add a track to the first cache.

FIG. 9 illustrates an embodiment of operations performed by the cache manager 24 to add, i.e., promote, a track to the first cache 14, which track may comprise a write or modified track from a host 2a, 2b . . . 2n, a non-sequential track in the second cache 18 that is subject to a read request and as a result moved to the first cache 14, or read requested data not found in either cache 14 or 18 and retrieved from the storage 10. Upon receiving (at block 300) the track to add to the first cache 14, the cache manager 24 creates (at block 301) a control block 100 (FIG. 4) for the track to add indicating the 104 location in the first cache 14 and whether the track is modified/unmodified 106 and sequential/non-sequential 108. This control block 100 is added to the control block directory 52 of the first cache 14. The cache manager 24 adds (at block 302) an entry to the first cache track index 50 having the track ID of track to add and an index to the created cache control block 100 in the control block directory 52. An entry is added (at block 304) to the MRU end of the LRU list 54, 56 or 58 of the track type of the track to add. If (at block 306) the track to add is a modified non-sequential track, then the track to add is also copied (at block 308) to the first cache backup device 16 and an entry is added to the first cache backup device index 30 for the added track. If (at block 306) the track to add is unmodified sequential, control ends.

Figure 10:
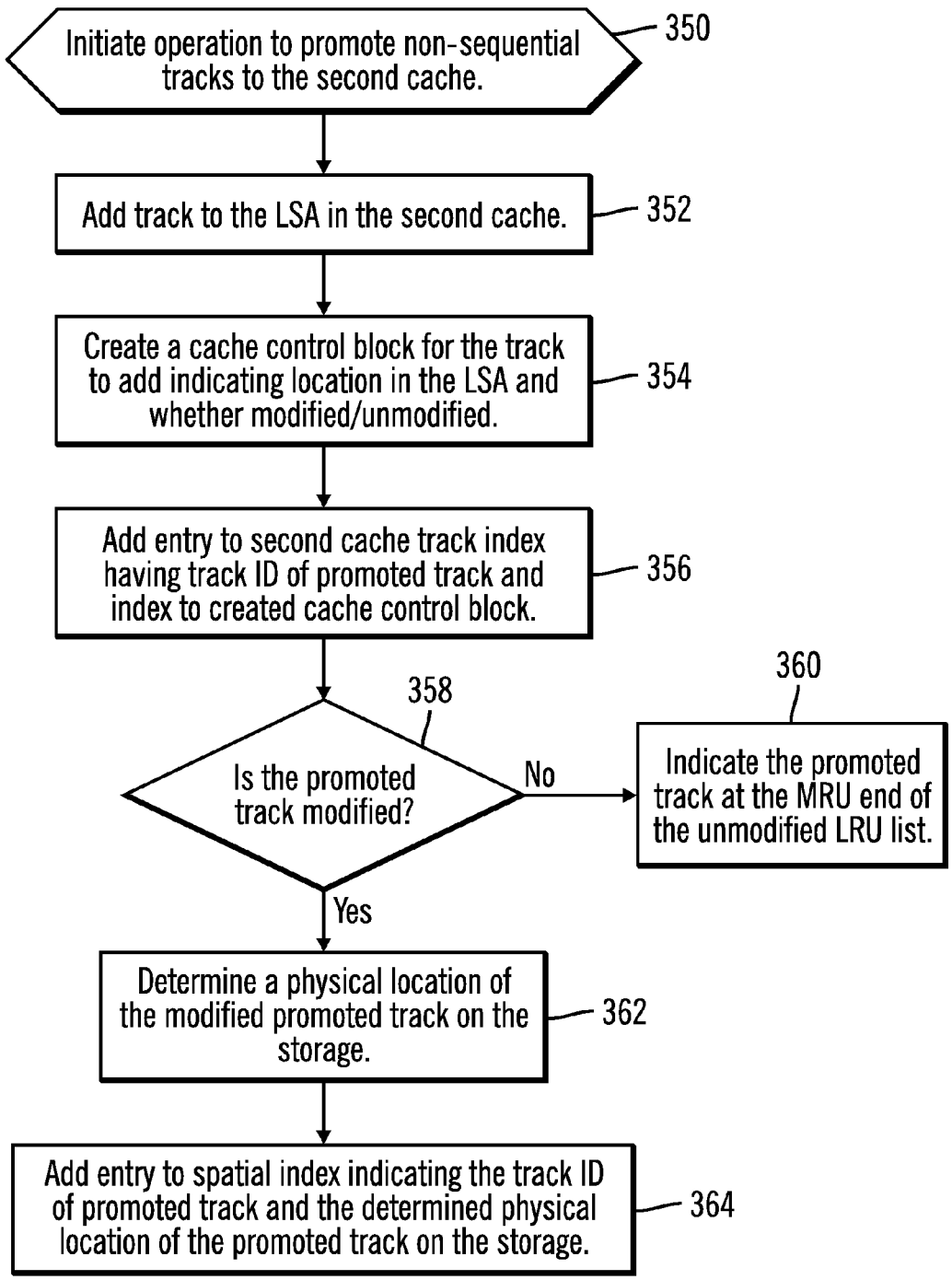
FIG. 10 illustrates an embodiment of operations to promote a track to the second cache.

FIG. 10 illustrates an embodiment of operations performed by the cache manager 24 to promote non-sequential tracks to the second cache 18 that is being demoted from the first cache 14. Upon initiating (at block 350) the operation to promote a track to the second cache 18, the cache manager 24 adds (at block 352) the track being promoted to the LSA 32 in the second cache 18 and creates (at block 354) a control block 120 (FIG. 5) for the track to add indicating the track location 124 in the LSA 32 and whether the track is modified/unmodified 126. An entry is added (at block 356) to the second cache track index 70 having the track ID of the promoted track and an index to the created cache control block 120 in the control block directory 72 for the second cache 18. If (from the no branch of block 358) the track being promoted is unmodified data, then the cache manager 24 indicates (at block 360) the promoted track at the MRU end of the unmodified LRU list 74, such as by adding the track ID to the MRU end. If (at block 358) the promoted track is modified data, then the cache manager 24 determines (at block 362) a physical location of the where to write the modified promoted track on the storage 10 and adds (at block 364) an entry to the spatial index 76 indicating the track ID 142 of the promoted track and the determined physical location 144 of the promoted track on the storage 10.

Figure 11:
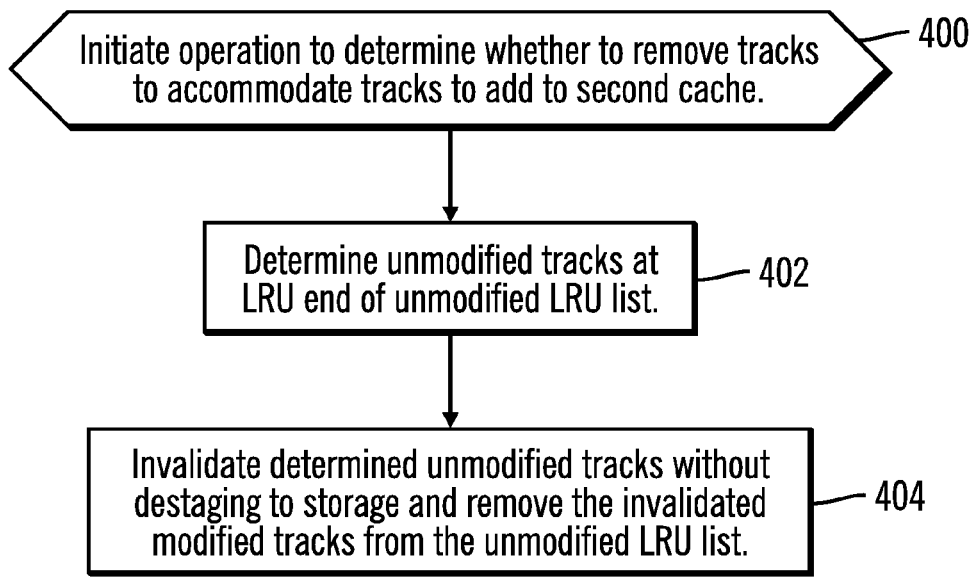
FIG. 11 illustrates an embodiment of operations to free space in the second cache.

FIG. 11 illustrates an embodiment of operations performed by the cache manager 24 to free space in the second cache 18 for new tracks to add to the second cache 18, i.e., tracks being demoted from the first cache 14. Upon initiating this operation (at block 400) the cache manager 24 determines (at block 402) unmodified tracks in the second cache 18 from the LRU end of the unmodified LRU list 74 and invalidates (at block 404) the determined unmodified tracks without destaging the invalidated unmodified tracks to the storage 10, and also removes the invalidated unmodified tracks from the unmodified LRU list 74.

Figure 12:
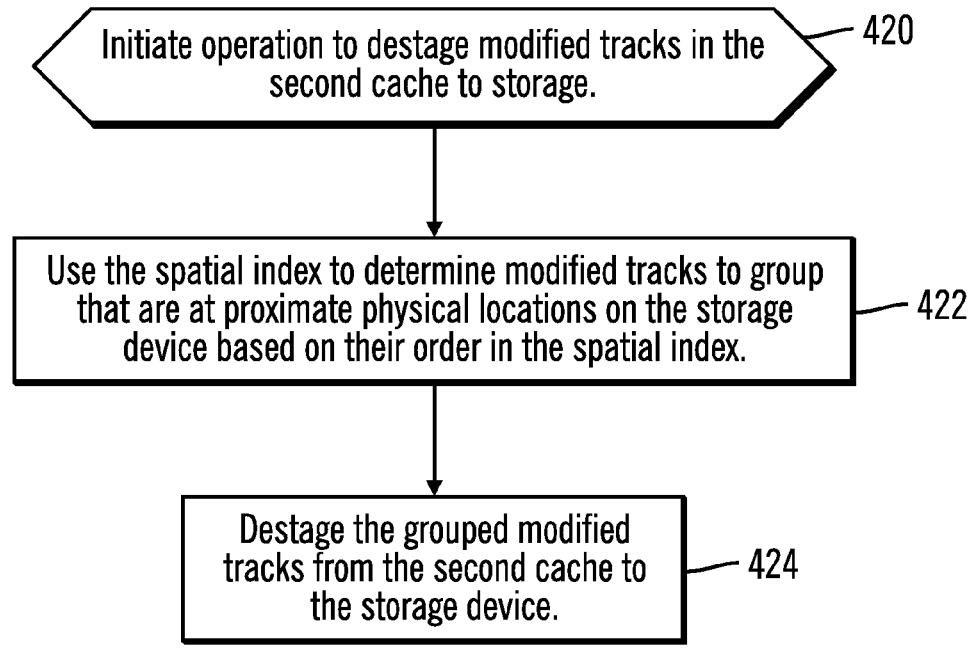
FIG. 12 illustrates an embodiment of operations to destage modified tracks from the second cache.

FIG. 12 illustrates an embodiment of operations performed by the cache manager 24 to destage modified tracks in the second cache 12 to the storage 10. Upon initiating (at block 420) the destage operation, the cache manager 24 uses (at block 422) the spatial index 76 to determine modified tracks in the second cache 18 to group that are at proximate physical locations on the storage device based on their order in the spatial index 76, such as a group of tracks at consecutive entries 140 (FIG. 6) in the location ordered spatial index 76. The determined grouped modified tracks are destaged (at block 424) from the second cache 18 to the storage device 10.

The operations of FIG. 12 optimize write operations to the storage 10, which comprises a sequential access storage device, by having the storage 10 write tracks at physical locations at closest physical proximity on the storage 10 writing surface, thus minimizing the amount of seeking and movement of the storage 10 write head to write the tracks in the second cache 18 to storage 10. The tracks were promoted to the second cache 18 from the from the first cache 16 based on temporal factors, such as their position in an LRU list 54, 56, 58, and not in an order optimized for sequential writing to a sequential access storage 10, such as a hard disk drive. Thus, the operations of FIG. 12 optimize the temporally ordered modified tracks based on their spatial location on the storage 10 to optimize writing at the storage 10.

Figure 13:
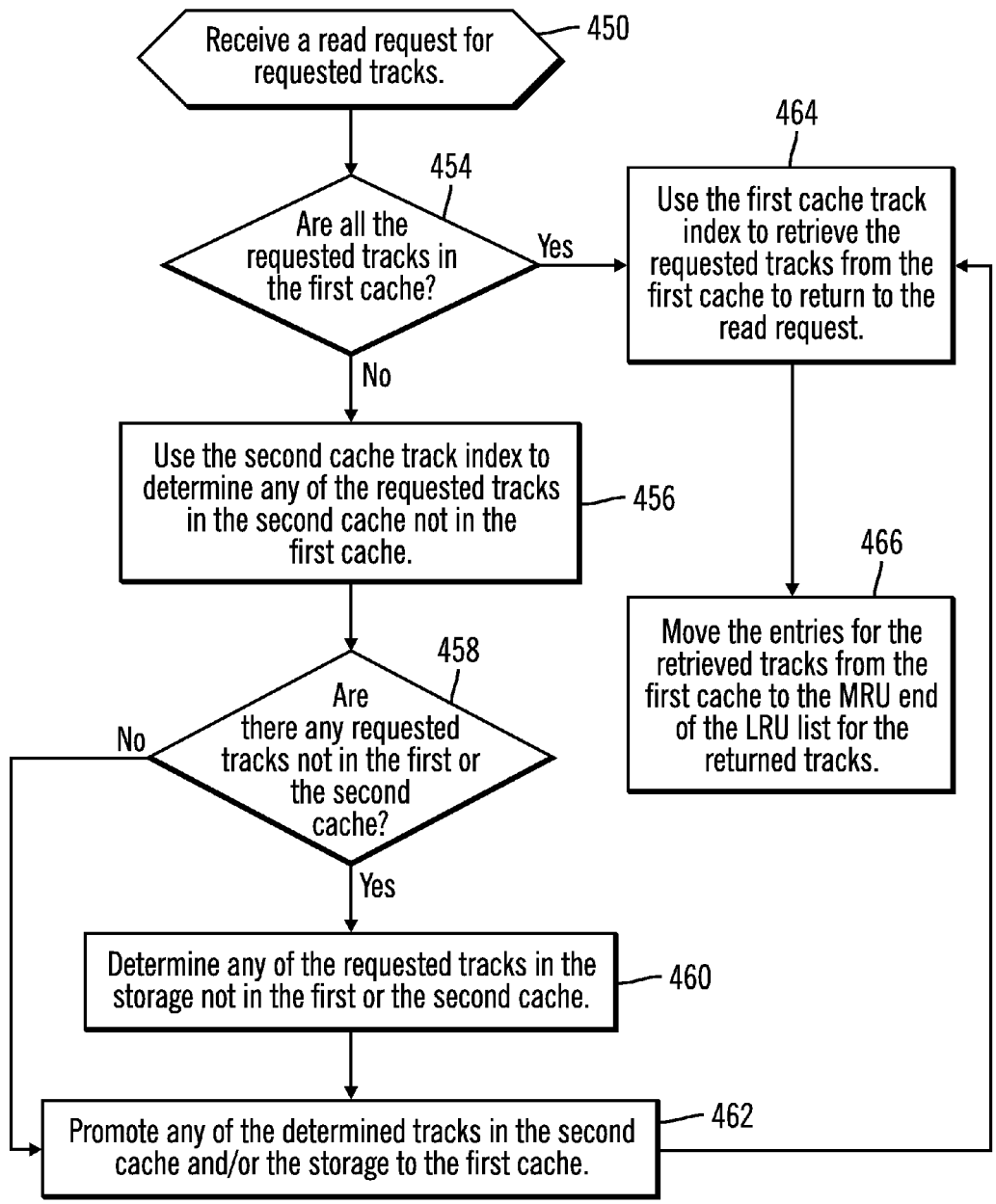
FIG. 13 illustrates an embodiment of operations to process a request for tracks to return to a read request.

FIG. 13 illustrates an embodiment of operations performed by the cache manager 24 to retrieve requested tracks for a read request from the caches 14 and 18 and storage 10. The storage manager 22 processing the read request may submit requests to the cache manager 24 for the requested tracks. Upon receiving (at block 450) the request for the tracks, the cache manager 24 uses (at block 454) the first cache track index 50 to determine whether all of the requested tracks are in the first cache 14. If (at block 454) all requested tracks are not in the first cache 14, then the cache manager 24 uses (at block 456) the second cache track index 70 to determine any of the requested tracks in the second cache 18 not in the first cache 14. If (at block 458) there are any requested tracks not found in the first 14 and second 18 caches, then the cache manager 24 determines (at block 460) any of the requested tracks in the storage 10, from the second cache track index 70, not in the first 14 and the second 18 caches. The cache manager 24 then promotes (at block 462) any of the determined tracks in the second cache 18 and the storage 10 to the first cache 14. The cache manager 24 uses (at block 464) the first cache track index 50 to retrieve the requested tracks from the first cache 14 to return to the read request. The entries for the retrieved tracks are moved (at block 466) to the MRU end of the LRU list 54, 56, 58 including entries for the retrieved tracks. With the operations of FIG. 13, the cache manager 24 retrieves requested tracks from a highest level cache 14, then second cache 18 first before going to the storage 10, because the caches 14 and 18 would have the most recent modified version of a requested track. The most recent version is first found in the first cache 14, then the second cache 18 if not in the first cache 14 and then the storage 10 if not in either cache 14, 18.

With the operations of FIG. 13, the cache manager 24 retrieves requested tracks from a highest level cache 14, then second cache 18 first before going to the storage 10, because the caches 14 and 18 would have the most recent modified version of a requested track. The most recent version is first found in the first cache 14, then the second cache 18 if not in the first cache 14 and then the storage 10 if not in either cache 14, 18.

Described embodiments provide techniques for allowing the use of a second level cache between a primary or first level cache and a storage to increase the cache space when the fastest access first cache 14 has the most expensive space, cost per byte, and a second cache, less expensive than the first cache but faster than the storage, can be used to increase the amount of cached data in the system. Increasing faster access cached storage space improves access to the cached data when requested data is in the cache and can be returned from cache instead of having to retrieve from the slower access, less expensive storage. Further, in described embodiments, tracks are added to the second cache based on a temporal ordering in the first cache, and then sorted in the second cache based on spatial physical location in the sequential access storage so that destaged tracks are written in groups of tracks at proximate or consecutive physical locations in the storage to optimize the writing of the tracks to the storage.

Populating Strides from Tracks in the First Cache to Demote to the Second Cache

Figure 14:
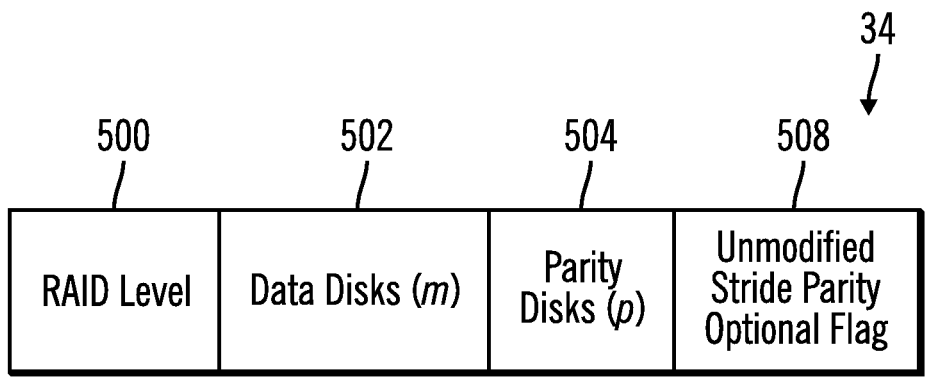
FIG. 14 illustrates an embodiment of a second cache RAID configuration.

FIG. 14 illustrates an embodiment of the second cache RAID configuration 34 that is maintained to determine how to form strides of tracks in the first cache 14 to promote to the second cache 18. A RAID level 500 indicates the RAID configuration to use, e.g., RAID 1, RAID 5, RAID 6, etc., a number of data disks (m) 502 storing tracks of user data, and a number of parity disks (p) 504 storing parity calculated from the data disks 502, where p can be one or more, indicating the number of disks for storing the calculated parity blocks. An unmodified parity optional flag 508 indicates whether parity should be calculated for umodified non-sequential tracks in the first cache 14 being destaged to the second cache 18. This optional flag 508 allows for only including unmodified non-sequential tracks in a stride to fill the stride with only unmodified non-sequential tracks. The stride of unmodified sequential tracks in the first cache may be stored in an LSA 32 in a single storage device, where the second cache 18 may be comprised of only the single storage device.

Figure 15:
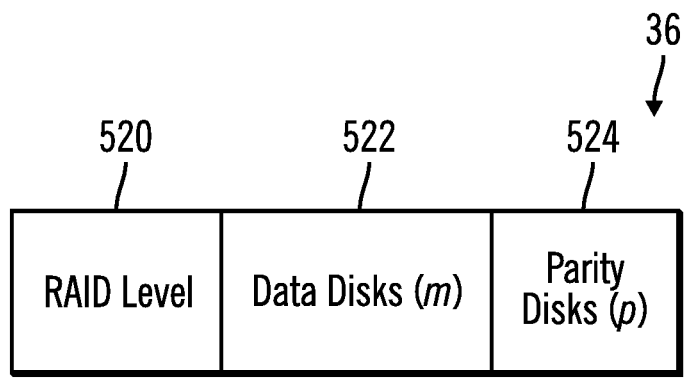
FIG. 15 illustrates an embodiment of a storage RAID configuration.

FIG. 15 illustrates an embodiment of the storage RAID configuration 36 that is maintained to determine how to form strides of modified tracks in the second cache 18 to destage to the storage 10. A RAID level 520 indicates the RAID configuration to use, a number of data disks (m) 522 storing tracks of user data, and a number of parity disks (p) 524 storing parity calculated from the data disks 522, where p can be one or more, indicating the number of disks for storing the calculated parity blocks. The stride of tracks from the second cache 18 may be striped across disks in the storage system 10.

In one embodiment, the second cache 34 and storage 36 RAID configurations may provide different parameters or have the same parameters, such as different RAID levels, data disks, parity disks, etc.

Figure 16:
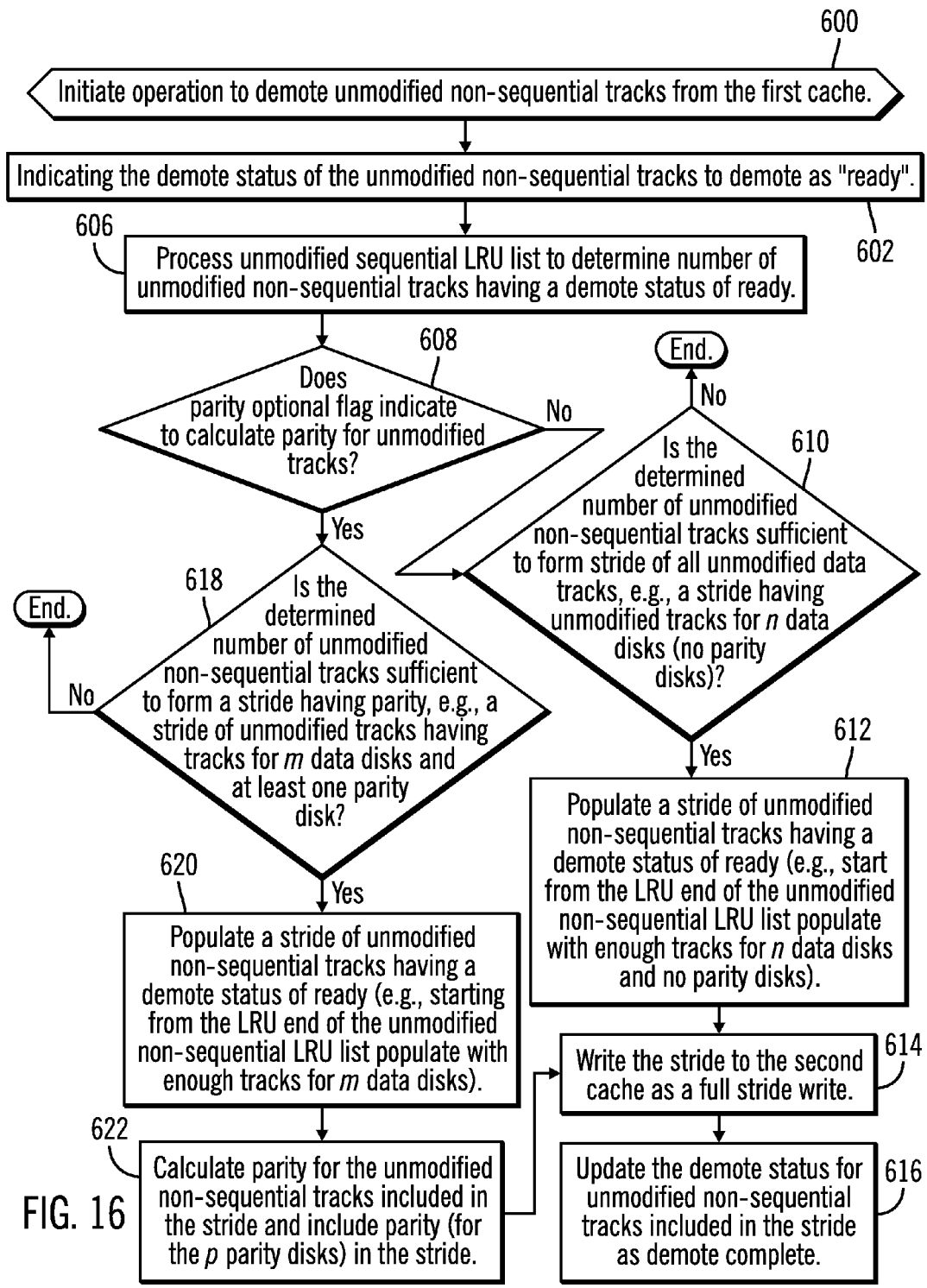
FIG. 16 illustrates an embodiment of operations to demote unmodified non-sequential tracks from the first cache in strides to the second cache.

FIG. 16 illustrates an embodiment of operations to demote unmodified non-sequential tracks from the first cache 14 to promote to the second cache 18, where the unmodified non-sequential tracks may be selected from the LRU end of the unmodified non-sequential LRU list 58 when space is needed. Upon initiating (at block 600) the operation to demote selected unmodified non-sequential tracks, the demote status 110 (FIG. 4) of the unmodified non-sequential tracks selected to demote is set (at block 602) to "ready". The cache manager 24 processes (at block 606) the unmodified sequential LRU 58 list to determine a number of unmodified non-sequential tracks having a demote status 110 of ready in their control blocks 100. If (at bock 608) the parity optional flag 508 indicates to calculate parity for the unmodified non-sequential tracks, then the cache manager 24 determines (at block 610) whether the determined number of unmodified non-sequential tracks is sufficient is to form a stride of all unmodified data tracks, e.g., a stride having unmodified tracks for n data disks and no parity disks. The stride for the second cache 18 may be defined according to the second cache RAID configuration information 34. If (at block 610) such a stride can be formed, then the cache manager 24 populates (at block 612) a stride of unmodified non-sequential tracks having a demote status 110 of ready. In one embodiment, the stride may be populated starting from the LRU end of the unmodified non-sequential LRU list 58 and use enough tracks to fill a stride of n data disks and no parity disks. If (at block 610) a stride cannot be formed, then control ends until there are a sufficient number of unmodified non-sequential tracks having the demote ready status.

If (at block 608) the parity optional flag 508 indicates to calculate parity for unmodified non-sequential tracks, then the cache manager 24 determines (at block 618) whether the determined number of unmodified non-sequential tracks is sufficient to form a stride having parity, e.g., a stride of unmodified tracks for m data disks and at least one parity disk. If (at block 618) the number of tracks are sufficient, then the cache manager 24 populates (at block 620) a stride of unmodified non-sequential tracks having a demote status 110 of ready. In one embodiment, the stride may be populated starting from the LRU end of the unmodified non-sequential LRU list 58 and use enough tracks for m data disks. The cache manager 24 calculates (at block 622) parity for the unmodified non-sequential tracks included in the stride and includes parity data (for the p parity disks) in the stride.

If (from the no branches of blocks 610 and 618) a stride cannot be formed, then control ends until there are a sufficient number of unmodified non-sequential tracks having the demote ready status. After populating the stride (at block 612 or 622), the cache manager 24 writes (at block 614) the stride to the second cache 18 as a full stride write and updates (at block 616) the demote status 110 for the unmodified non-sequential tracks included in the stride as demote "complete".

Figure 17:
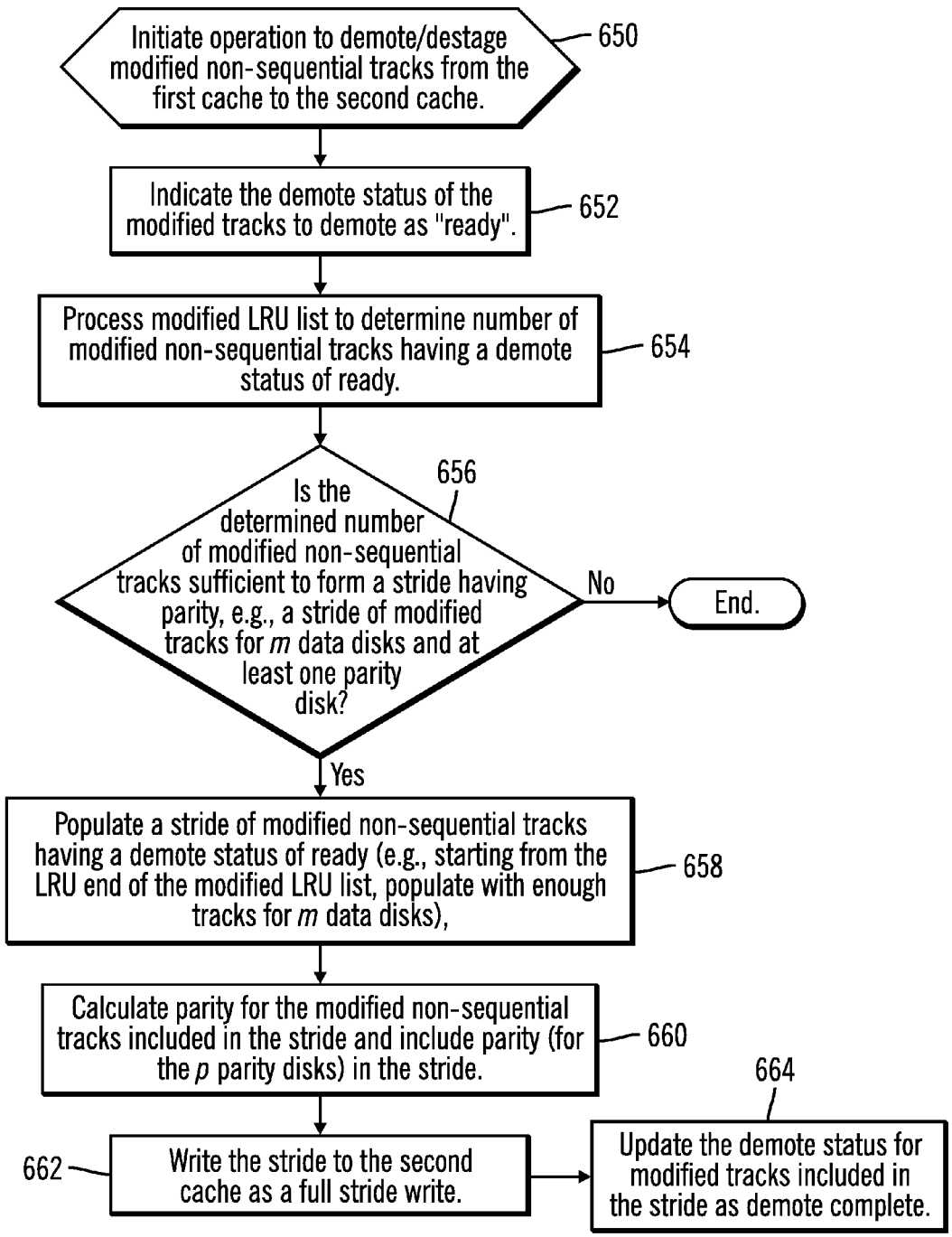
FIG. 17 illustrates an embodiment of operations to demote/destage modified non-sequential tracks from the first cache in strides to the second cache.

FIG. 17 illustrates an embodiment of operations to demote/destage modified tracks (sequential or non-sequential) from the first cache 14 to the second cache 18. Modified tracks may be continually destaged as part of scheduled operations and to free space in the first cache backup device 16. Upon initiating (at block 650) the operation to demote/destage modified tracks, which may be selected from the modified LRU list 56, the cache manager 24 indicates (at block 652) the demote status 110 (FIG. 4) of the modified tracks to "ready". The cache manager 24 processes (at block 654) the modified LRU list 56 to determine a number of modified non-sequential tracks having a demote status of ready. If (at block 656) the determined number of modified non-sequential tracks is sufficient to form a stride having parity, e.g., a stride of modified non-sequential tracks for m data disks and at least one parity disk, then the cache manager 24 populates (at block 658) a stride of unmodified non-sequential tracks having a demote status 110 of ready. The stride may be populated starting from the LRU end of the modified non-sequential LRU list 56 to fine enough tracks for the data disks.

The cache manager 24 calculates (at block 660) parity for the modified non-sequential tracks included in the stride and includes the calculated parity for the p parity disks in the stride. After populating the stride, the cache manager 24 writes (at block 662) the stride to the second cache 18 as a full stride write and updates (at block 664) the demote status 110 for the unmodified non-sequential tracks included in the stride as demote complete.

Figure 18:
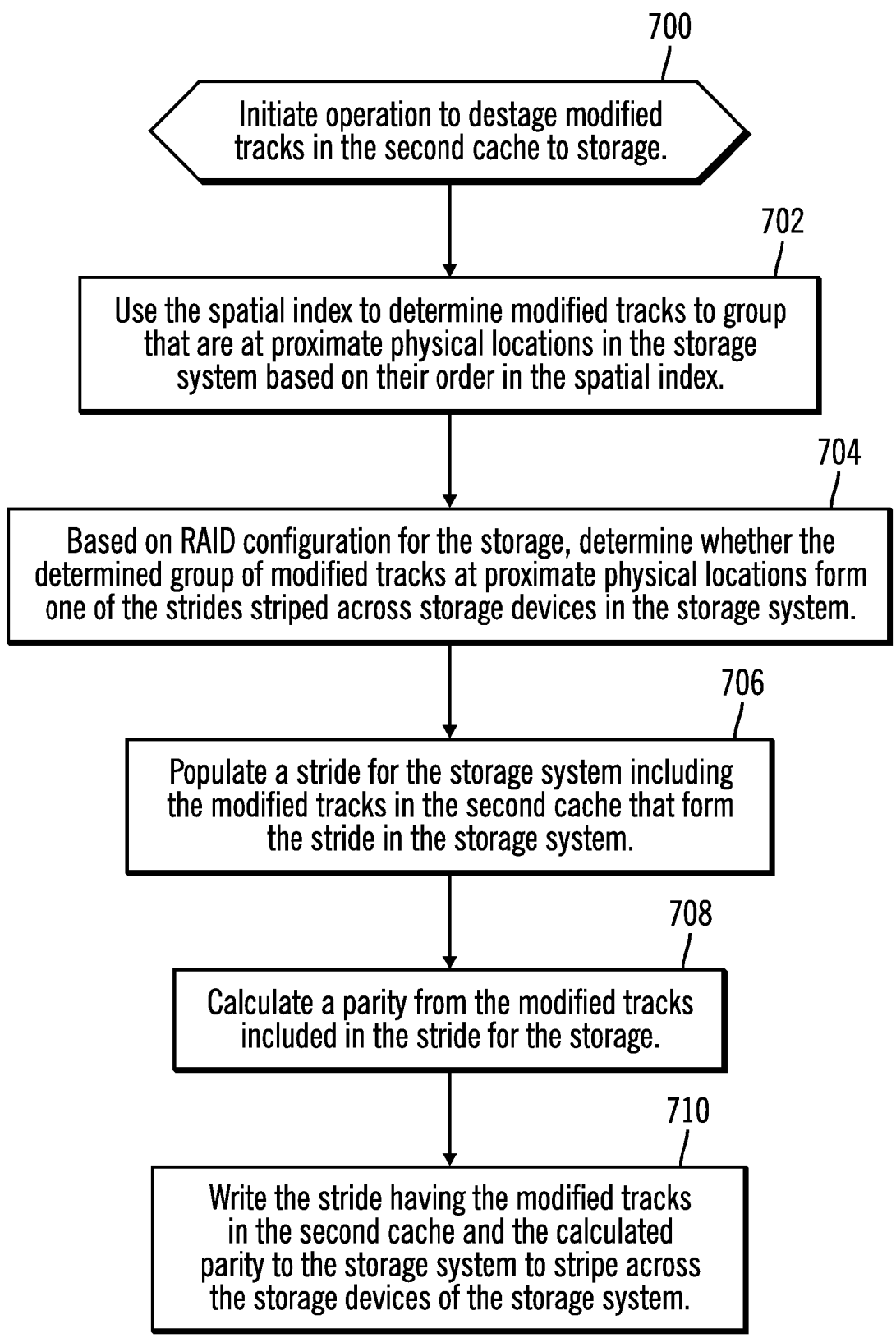
FIG. 18 illustrates an embodiment of operations to demote modified non-sequential tracks in the second cache to the storage.

FIG. 18 illustrates an embodiment of operations performed by the cache manager 24 to destage modified non-sequential tracks in the second cache 18 to the storage system 10. Upon initiating (at block 700) the destage operation, the cache manager 24 uses (at block 702) the spatial index 76 to determine modified tracks to group that are at proximate physical locations in the storage system 10 based on their order in the spatial index. Based on the RAID configuration 36 for the storage 10, the cache manger 24 determines (at block 704) whether the determined group of modified tracks at proximate physical locations forms one of the strides striped across storage devices in the storage system. The stride for the storage 10 may be defined according to the storage RAID configuration information 36. The cache manager 24 populates (at block 706) a stride for the storage system 10 including the modified tracks in the second cache 18 that form the stride in the storage system 10. The cache manager 24 further calculates (at block 708) a parity from the modified tracks included in the stride for the storage 10 and writes (at block 710) the stride having the modified tracks in the second cache and the calculated parity to the storage system 10 to stripe across the storage devices of the storage system 10.

Described embodiments provide techniques to group tracks in a first cache in strides defined according to a RAID configuration for the second cache, so that tracks in the first cache can be grouped in strides to a second cache. The tracks cached in the second cache may then be grouped into strides, defined according to a RAID configuration for the storage, and then written to the storage system. The described embodiments allow full stride writes to be used to promote demoted tracks in the first cache to the second cache.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7-18 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    maintaining in a first cache modified and unmodified tracks from a storage system subject to Input/Output (I/O) requests;
    determining to demote tracks from the first cache;
    determining whether there are enough tracks ready to demote to form a stride, wherein tracks are written to a second cache in strides defined for a Redundant Array of Independent Disk (RAID) configuration;
    populating a stride with tracks ready to demote in response to determining that there are enough tracks ready to demote to form the stride;
    promoting the stride of tracks ready to demote from the first cache to the second cache;
    demoting from the first cache the stride of tracks promoted to the second cache; and
    destaging the tracks in the second cache that are modified to the storage system.

2. The method of claim 1, wherein the first cache is a faster access device than the second cache and wherein the second cache is a faster access device than the storage devices.

3. The method of claim 1, further comprising:
    calculating parity for the tracks included in the stride being promoted to the second cache; and
    writing the stride of the tracks to demote and the parity calculated from the tracks in the stride to the second cache.

4. The method of claim 3, wherein the parity is calculated to include in the stride in response to determining that the tracks to demote in the stride to the second cache comprise modified tracks.

5. The method of claim 4, further comprising:
    determining whether a parity optional control flag indicates whether to calculate parity for unmodified tracks in a stride in response to determining that the tracks to include in the stride comprise unmodified tracks, wherein the parity is calculated to include in the stride of unmodified tracks in response to determining that the parity optional control flag indicates to calculate parity for unmodified tracks to demote, wherein a stride including unmodified tracks are promoted to the second cache without parity in response to determining that the parity optional control flag indicates to not calculate parity for unmodified tracks.

6. The method of claim 1, wherein the RAID configuration is defined as having n drives comprising m drives for storing tracks of data and at least one parity drive to store the parity data calculated from the tracks of data for the m drives, further comprising:
    in response to forming a stride for modified tracks to demote to the second cache, calculating parity for the modified tracks for the m drives, wherein the stride of the modified tracks to demote from the first cache and promote to the second cache includes modified tracks for the m drives and parity data for the at least one parity drive;
    in response to forming a stride for unmodified tracks to demote to the second cache, including unmodified tracks to demote for n drives, wherein the stride for unmodified tracks to demote does not include parity data; and
    issuing a write operation to write the stride of the tracks to demote to the second cache.

7. The method of claim 1, wherein the storage system is comprised of storage devices and stores tracks in strides striped across the storage devices in a RAID configuration, wherein destaging the tracks in the second cache to the storage system comprises:
    determining whether there are modified tracks in the second cache that form one of the strides striped across the storage devices in the storage system;
    populating a stride for the storage system including the modified tracks in the second cache that form the stride in the storage system;
    calculating parity from the modified tracks included in the stride for the storage system; and
    writing the stride having the modified tracks in the second cache and the calculated parity to the storage system to stripe across the storage devices of the storage system.

8. The method of claim 1, wherein the first cache comprises a Random Access Memory (RAM), the second cache comprises a flash device, and the storage system is comprised of at least one slower access device than the flash device.

9. The method of claim 1, wherein the second cache comprises at least one storage device.

10. The method of claim 1, further comprising:
    indicating in a control block for a track that the track is ready to demote in response to determining to demote the track, wherein the tracks having control blocks indicating they are ready to demote are demoted in response to the determining that there are enough tracks ready to demote to form a stride.

11. The method of claim 1, wherein determining whether there are enough tracks ready to demote to form a stride comprises determining from a least recently used list (LRU) the tracks ready to demote.

12. The method of claim 1, wherein the second cache stores tracks demoted from the first cache in a log structured array implemented in the second cache.

* * * * *